(12) United States Patent
Bangs

(10) Patent No.: US 6,206,953 B1
(45) Date of Patent: *Mar. 27, 2001

(54) CONDENSATE SEPARATOR AND COLLECTOR

(76) Inventor: Jonathan F. Bangs, 833 Dwyer Rd., Virginia Beach, VA (US) 23454

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/004,373

(22) Filed: Jan. 8, 1998

Related U.S. Application Data

(60) Provisional application No. 60/034,984, filed on Jan. 8, 1997.

(51) Int. Cl.[7] .............................. B01D 45/12; B01D 46/00

(52) U.S. Cl. ................... 95/268; 55/337; 55/421; 55/DIG. 17

(58) Field of Search .................. 95/268; 55/320, 55/322, 323, 327, 332, 337, DIG. 17, 421

(56) References Cited

U.S. PATENT DOCUMENTS

| | | | |
|---|---|---|---|
| 321,338 | * 6/1885 | Burk | 55/421 |
| 2,096,851 | * 10/1937 | Fricke | 55/DIG. 17 |
| 2,511,967 | * 6/1950 | Campbell | 55/337 |
| 2,822,887 | * 2/1958 | Engman | 55/322 |
| 2,894,600 | * 7/1959 | Veres | 55/DIG. 17 |
| 3,901,670 | * 8/1975 | Minami | 55/337 |
| 4,388,086 | 6/1983 | Bauer et al. | 95/118 |
| 4,402,493 | * 9/1983 | Tsuge | 55/DIG. 17 |
| 4,402,715 | * 9/1983 | Ruyak et al. | 55/DIG. 17 |
| 4,516,994 | * 5/1985 | Kocher | 55/337 |
| 4,666,473 | 5/1987 | Gerdau | 95/268 |
| 4,828,589 | 5/1989 | Bauer et al. | 96/109 |
| 4,872,890 | * 10/1989 | Lamprecht et al. | 55/323 |
| 4,906,264 | * 3/1990 | Szymaszek et al. | 55/337 |
| 5,053,126 | * 10/1991 | Krasnoff | 55/320 |
| 5,113,671 | * 5/1992 | Westermeyer | 55/337 |
| 5,409,514 | * 4/1995 | Ragusa et al. | 55/DIG. 17 |
| 5,676,717 | * 10/1997 | Cope et al. | 55/337 |
| 5,746,791 | * 5/1998 | Wang | 55/DIG. 17 |

* cited by examiner

*Primary Examiner*—Duane S. Smith

(57) ABSTRACT

A fluid separator for separating a liquid such as oil/water from air delivered from a compressor during the condensate drain cycle of the compressor.

14 Claims, 2 Drawing Sheets

CONDENSATE SEPARATOR AND COLLECTOR

CROSS REFERENCE TO RELATED APPLICATION

The present application claims priority from provisional patent application Ser. No. 60/034,984 filed Jan. 8, 1997.

FIELD OF THE INVENTION

The present invention relates generally to a fluid separator and more specifically to an oil/water/air separator for a compressed gas unit which separates oil/water from air during the condensate drain cycle of the compressor so that the oil/water can be collected and the air can be dumped to atmosphere.

BACKGROUND OF THE INVENTION

In conventional systems for compressing a gaseous fluid, a liquid, for example oil, is added to the gaseous fluid as a byproduct of the compressor lubrication system. In addition water is present in the ambient air and is condensed as a part of the compression process. These liquids must be removed in a separating unit prior to the compressed gaseous fluid being delivered to the consumer. Environmental concerns have dictated that any air exhausted to the atmosphere must also be free of oil/water so that the air must be filtered and the oil/water mixture separated from the air during the drain cycle of the compressor.

SUMMARY OF THE INVENTION

The present invention relates generally to a fluid separator for separating a liquid such as oil or water from air delivered from a compressor during the condensate drain cycle of the compressor. The separator includes a housing having an inlet and an outlet. The inlet is configured so as to impart a swirl to a gaseous fluid which enters the inlet. The separator also includes a means to change the direction of the flow of the gaseous fluid. The separator also includes a first filter within the housing in the path of the fluid flow and a second filter within the housing between the first filter and the outlet of the housing. Means for collecting the separated liquid are also provided.

DETAILED DESCRIPTION OF THE PREFERRED EMBODIMENT

Figure 1:
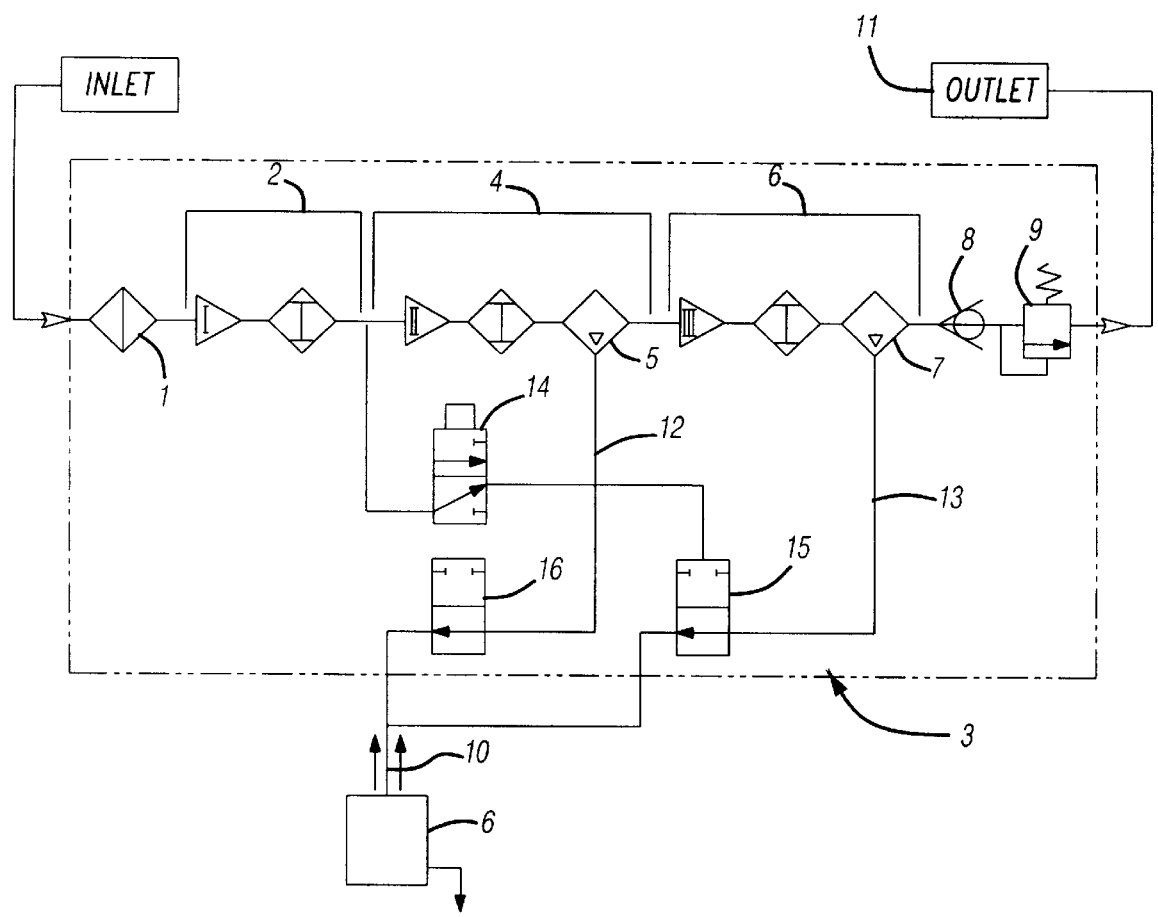
FIG. 1 is a block diagram for a compressor system.

Referring to the drawings and more particularly to FIG. 1 there is illustrated diagrammatically a compressor system for a gaseous fluid such as ambient air. A compressor is illustrated diagrammatically by reference numeral 3 and includes a filter 1 through which atmospheric air is supplied to the inlet of a first stage 2 of the compressor 3. Compressed air is delivered from the first stage 2 to a second stage 4 of the compressor 3. The second stage 4 is provided with a condensate separator 5 which separates water and oil from the compressed air before the compressed air is delivered to a third stage 6 of the compressor 3 for further compression. The moving parts of the compressor 3 are lubricated with oil which mixes with the air compressed in the compressor 3. Water is included in the ambient air and it too must be removed prior to delivery of the air in its compressed form. The third stage 6 of the compressor 3 also includes a condensate separator 7 to remove water and oil from the compressed air. Compressed air from the third stage 6 of the compressor 3 flows through valves 8 and 9 to an outlet 11 for use in a suitably compressed form devoid of water and oil.

The condensate separators 5 and 7 include drain lines 12 and 13 respectively which communicate with the condensate separator and collector (CSC) 6 through drain valves 15 and 16 respectively.

Periodically it is necessary to drain the condensate separators 5 and 7 of the compressor 3 and when this becomes necessary a valve 14 is actuated to open the valves 15 and 16 to permit condensate in the form of an air and oil/water mixture to flow to the condensate separator and collector 6 of the present invention.

Figure 3:
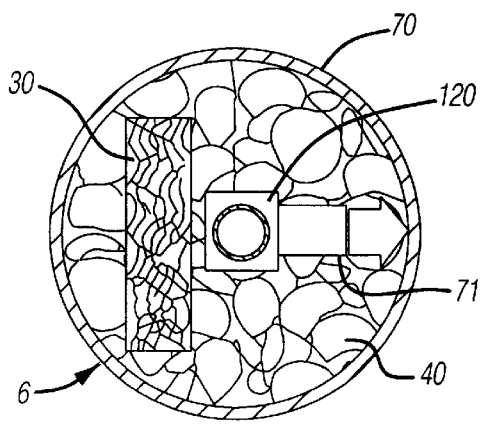
FIG. 3 is a cross-sectional view of the fluid separator of FIG. 2 taken along lines 3—3.
Figure 2:
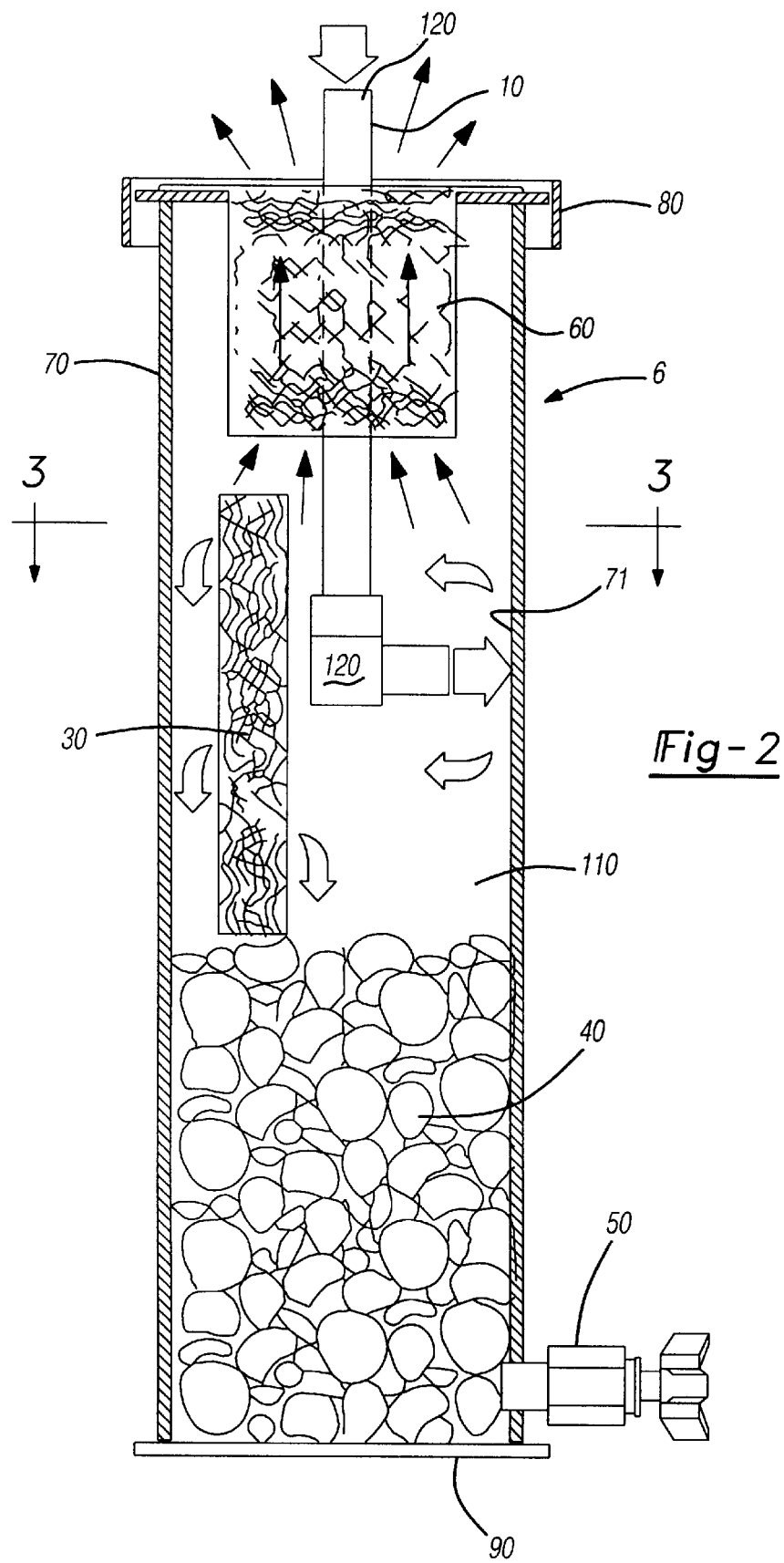
FIG. 2 is a longitudinal cross-sectional view of the fluid separator according to the present invention.

The condensate separator and collector 6 is best shown in FIGS. 2 and 3 as including a substantially cylindrical housing 70 having an upper end cap 80 and a lower end cap 90 which define a chamber 110. An inlet 10 is provided in the upper end cap 80 and connects the chamber 110 to the lines 12 and 13. The inlet 10 is in the form of a pipe which extends into the housing 70 and is provided with internal grooves 120 which impart a swirl to the mixture of air and water/oil draining from the compressor 3. The inlet pipe 10 extends into the chamber 110 as shown in FIG. 2 and at its inner end is connected to an elbow 122 so that the mixture is directed in a spiraling motion through the elbow 122 and impinges against the inner wall 71 of the housing 70. Some of the liquid is separated from the air at this point and more is separated as the air passes through a filter 30 disposed in the path of the mixture rebounding off the inner wall 71. The oil and water which is separated from the air drops to the bottom of the housing 70 and is retained by a gravel bed 40 until it is manually drained through a valve 50.

The air is vented through an outlet 130 provided in the upper end cap 80 after passing through a filter 60 to further remove water/oil mist which has not been removed by the filter 30.

In view of the teaching presented herein, other modifications and variations of the present inventions will be readily apparent to those of skill in the art. The foregoing drawings, discussion, and description are illustrative of one embodiment of the present invention; but are not meant to be limitations on the practice thereof. It is the following claims, including all equivalents, which define the scope of the invention.

I claim:

1. An apparatus for separating an entrained liquid from a stream of compressed gaseous fluid, said apparatus comprising:

a housing having a side wall and an inlet pipe and an outlet, said inlet pipe extending into an interior of said housing and terminating at an end;

a stationary elbow disposed on said end of said inlet pipe and having an exit end directed perpendicularly toward said side wall such that a gaseous fluid flowing through said elbow perpendicularly impinges said side wall and rebounds from said side wall; and a first filter disposed within said housing in a position opposite said exit end of said elbow such that at least a portion of the gaseous fluid rebounding off said side wall passes through said first filter.

2. The apparatus of claim 1 wherein said inlet pipe further comprises means for imparting a swirl to said gaseous fluid.

3. The apparatus of claim 2 wherein said means for imparting a swirl comprises at least one groove defined in an inner surface of said inlet pipe.

4. The apparatus of claim 1 wherein said housing comprises an end wall.

5. The apparatus of claim 4 wherein said inlet pipe passes through said end wall.

6. The apparatus of claim 4 wherein said outlet is disposed in said end wall.

7. The apparatus of claim 6 wherein said outlet comprises a opening defined in said upper end wall.

8. The apparatus of claim 1 wherein said housing is substantially cylindrical.

9. The apparatus of claim 1 further comprising a second filter disposed within said housing between said first filter and said outlet.

10. The apparatus of claim 1 further comprising means for collecting the liquid separated from the gaseous fluid.

11. The apparatus of claim 10 wherein said means for collecting the liquid comprises a gravel bed disposed in a interior bottom region of said housing.

12. The apparatus of claim 1 further comprising means for selectively draining liquid collected in said housing.

13. The apparatus of claim 12 wherein said means for selectively draining comprises a valve in said housing.

14. A method for separating an entrained liquid from a stream of compressed gaseous fluid, comprising the steps of:

a. introducing a stream of compressed gaseous fluid with an entrained liquid into a fixed inlet, said inlet extending into an interior of a housing and terminating at an end;

b. imparting a swirl to the gaseous fluid in said inlet;

c. directing said stream of gaseous fluid from said inlet end toward a side wall of said housing such that said fluid substantially perpendicularly impinges upon said side wall and rebounds from said side wall;

d. passing at least a portion of said rebounding gaseous fluid through a first filter disposed with said housing in a position opposite said exit end of side inlet.

* * * * *